United States Patent
Tanaka (10) Patent No.: US 10,607,379 B2
(45) Date of Patent: Mar. 31, 2020

(54) GRAPH DRAWING SYSTEM

(71) Applicant: CASIO COMPUTER CO., LTD., Shibuya-ku, Tokyo (JP)

(72) Inventor: Hirokazu Tanaka, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/124,533

(22) Filed: Sep. 7, 2018

(65) Prior Publication Data

US 2019/0096103 A1  Mar. 28, 2019

(30) Foreign Application Priority Data

Sep. 25, 2017 (JP) ................... 2017-183635

(51) Int. Cl.
  *G06T 11/20* (2006.01)
  *G06F 17/10* (2006.01)
  *G06F 15/02* (2006.01)
  *G06T 1/00* (2006.01)

(52) U.S. Cl.
  CPC ............ *G06T 11/206* (2013.01); *G06F 15/02* (2013.01); *G06F 17/10* (2013.01); *G06T 1/0007* (2013.01); *G06T 2200/24* (2013.01)

(58) Field of Classification Search
  CPC .......................... G06T 11/206; G06T 1/0007
  See application file for complete search history.

(56) References Cited

U.S. PATENT DOCUMENTS

| | | | | |
|---|---|---|---|---|
| 2014/0365954 A1* | 12/2014 | Yoshizawa | ............ | G06F 3/0485 715/784 |
| 2015/0268845 A1* | 9/2015 | Endo | ................... | G06F 3/04847 715/771 |
| 2016/0077725 A1* | 3/2016 | Maeda | ................ | G06F 3/04847 715/833 |
| 2017/0003926 A1* | 1/2017 | Kominac | .............. | G06F 3/0484 |

FOREIGN PATENT DOCUMENTS

JP         63103354 A        5/1988

* cited by examiner

*Primary Examiner* — Weiming He
(74) *Attorney, Agent, or Firm* — Holtz, Holtz & Volek PC (57) ABSTRACT

A graph drawing system includes an electronic device and a calculation server. A first processor of the electronic device transmits calculation inquiry data including information on a function entered by a user operation to the calculation server. A second processor of the calculation server calculates drawing information including coordinates of a plurality of drawing points represented by the function and plotted in a graph drawing area of the display, and continuity/discontinuity information indicating whether or not adjacent points of the drawing points should be connected to each other, based on the calculation inquiry data and transmits the drawing information to the electronic device. The first processor causes the display to display a graph corresponding to the function, based on the drawing information.

19 Claims, 7 Drawing Sheets

GRAPH DRAWING SYSTEM

CROSS-REFERENCE TO RELATED APPLICATIONS

This application is based upon and claims the benefit of priority from prior Japanese Patent Application No. 2017-183635, filed Sep. 25, 2017, the entire contents of which are incorporated herein by reference.

BACKGROUND OF THE INVENTION

1. Field of the Invention

The present invention relates to a graph drawing system.

2. Description of the Related Art

A scientific calculator having a graph drawing function, which is a function of drawing a graph corresponding to a mathematical expression a user enters on a display screen, is known in the art. For example, Jpn. Pat. Appln. KOKAI Publication No. 63-103354 discloses a scientific calculator capable of superimposing different kinds of graphs on a display screen.

A website for realizing the above-mentioned graph drawing function is available in the internet environment. In the internet environment, a terminal, such as a personal computer (PC), tablet type information terminal or the like, accesses such a website and performs the following operation. That is, the terminal displays a mathematical expression input screen on the display screen. When a user enters a function on the mathematical expression input screen and presses a button for executing graph drawing, the terminal draws a graph corresponding to the function entered on the display screen.

As one of methods for drawing such a graph, a method in which coordinates of points are obtained by substituting a value sequentially changing with a predetermined step size into a target function and in which these points are connected by lines, is conceivable. In such a method, however, points that are discontinuous with each other may be connected by a line. That is, a graph including discontinuous points may not be drawn accurately.

BRIEF SUMMARY OF THE INVENTION

According to an aspect of the invention, a graph drawing system includes an electronic device, and a calculation server connected to the electronic device via a network. The electronic device includes an input device, a display, a first processor, and a first communication device. The calculation server includes a second processor and a second communication device. The first processor is configured to generate calculation inquiry data including information on a function if the information on the function is entered from the input device by a user operation, and transmit the calculation inquiry data to the calculation server via the first communication device. The second processor is configure to, in response to acquisition of the calculation inquiry data from the electronic device via the second communication device, calculate drawing information, based on the calculation inquiry data, the drawing information being information which the first processor uses for drawing a graph corresponding to the function, and including coordinates of a plurality of drawing points and continuity/discontinuity information. The coordinates of the plurality of drawing points are represented by the function and plotted in a graph drawing area of the display. The continuity/discontinuity information indicates whether or not adjacent points of the drawing points should be connected to each other. The second processor is configure to transmit the calculated drawing information to the electronic device via the second communication device. In response to acquisition of the drawing information from the calculation server via the first communication device, the first processor is configured to cause the display to display a graph corresponding to the function, based on the drawing information.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

<Configuration of Graph Drawing System>

Figure 1:
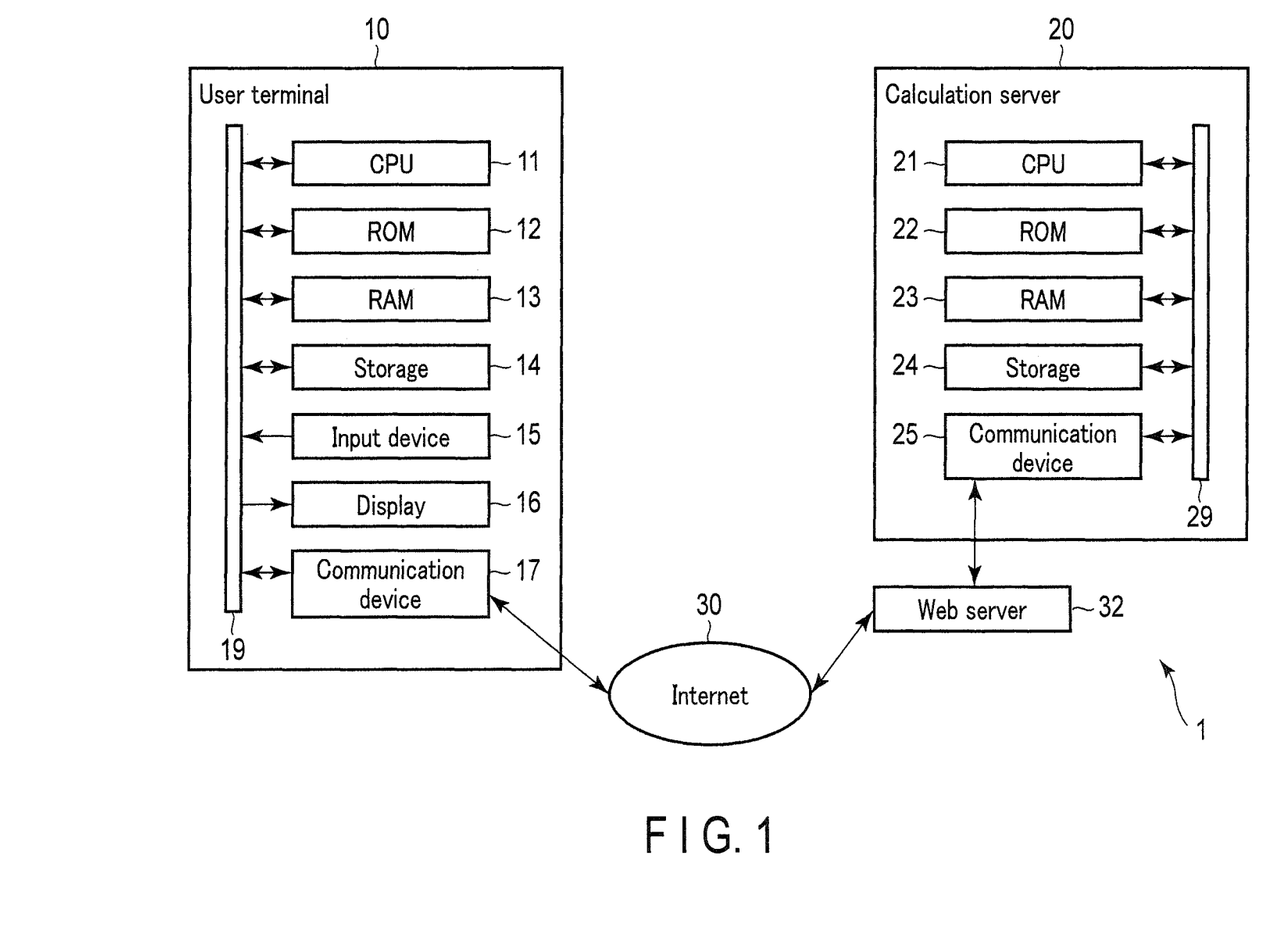
FIG. 1 is a block diagram schematically illustrating an exemplary configuration of a graph drawing system according to one embodiment.

The first embodiment of the present invention will now be described with reference to the accompanying drawings. FIG. 1 is a diagram schematically illustrating an exemplary configuration of a graph drawing system 1 according to the present embodiment. The graph drawing system 1 of the present embodiment includes a user terminal (electronic device) 10, a calculation server 20, and a web server 32. The user terminal 10 and the web server 32 are connected via a network, such as the internet 30. The web server 32 and the calculation server 20 are connected to each other. It is to be noted that the number of user terminals 10 connected to the graph drawing system 1 is not restricted.

On the web server 32, there is a back-end server for the scientific calculator web application, and the back-end server performs processing necessary for realizing the scientific calculator web application. Behind the web server 32, there is a calculation server 20 for a scientific calculator. The operation engine of the calculation server 20 is accessible only by the back-end server of the web server 32 and cannot be directly accessed from the outside, and therefore the operation engine is kept secret.

The user terminal 10 is such a device as a personal computer (PC), a tablet type information terminal or a smartphone. The user terminal 10 is a device on which a web browser operates. Using the web browser, the user terminal 10 accesses the calculation server 20 via the web server 32. The web browser that accesses the web server 32 downloads the related data, executes the scientific calculator web application, and displays various display data. The functions of the scientific calculator web application include a function graph drawing function. To execute the function graph drawing function, the user enters a mathematical expression to be drawn as a graph on the web browser of the user terminal 10. The user terminal 10 transmits the entered mathematical expression to the calculation server 20. The calculation server 20 creates data for drawing a graph corresponding to the entered mathematical expression as drawing information, and transmits the data to the user terminal 10. As described above, in the scientific calculator web application, various operation processes including calculation of graph drawing points are performed by the calculation server 20. Upon reception of the data, the user terminal 10 draws a graph on the web browser based on the data, and presents the graph.

As shown in FIG. 1, the user terminal 10 includes a central processing unit (CPU; first processor) 11, a read only memory (ROM) 12, a random access memory (RAM; first memory) 13, a storage (first storage) 14, an input device 15, a display 16, and a communication device (first communication device) 17. These elements are connected together via a bus line 19. The CPU 11 performs various kinds of operations. The ROM 12 stores a BIOS and the like. The RAM 13 functions as a main memory device of the CPU 11. As the RAM 13, a dynamic RAM (DRAM) or a static RAM (SRAM) can be used, for example. As the storage 14, a hard disk drive (HDD) or a solid state drive (SSD) is used, for example. The storage 14 stores various kinds of information, including programs and parameters used by the CPU 11. The RAM 13 and the storage 14 are not limited to those mentioned above and may be replaced with various storage devices. The input device 15 is, for example, a keyboard, a mouse, or a touch panel. The display 16 is, for example, a liquid crystal display. The communication device 17 is used when the user terminal 10 communicates with an external device. The communication device 17 is connected to the internet, for example. The communication device 17 includes an antenna and electronic circuits. The electronic circuits of the communication device 17 includes a memory storing a program for causing a wireless system to function, and interfaces that is to be connected to the network, such as the internet 30. The wireless system for the communication device 17 is, for example, Wi-Fi, Wireless LAN, Bluetooth, Bluetooth Low Energy (BLE), and so on.

As shown in FIG. 1, the calculation server 20 includes a CPU (second processor) 21, a ROM 22, a RAM (second memory) 23, a storage (second storage) 24, and a communication device (second communication device) 25. These elements are connected together via a bus line 29. The CPU 21 performs various kinds of operations. The ROM 22 stores information required for the CPU 21 to operate. The RAM 13 functions as a main memory device of the CPU 21. The storage 24 stores various kinds of information, including programs and parameters used by the CPU 21. The storage 24 also stores various operation results and the like. The communication device 25 is used for communication with the web server 32. The communication device 25 includes an antenna and electronic circuits. The electronic circuits of the communication device 25 includes a memory storing a program for causing a wireless system to function, and interfaces that is to be connected to the network, such as the internet 30. The wireless system for the communication device 25 is, for example, Wi-Fi, Wireless LAN, Bluetooth, Bluetooth Low Energy (BLE), and so on.

<Operation of Graph Drawing System>

Figure 2:
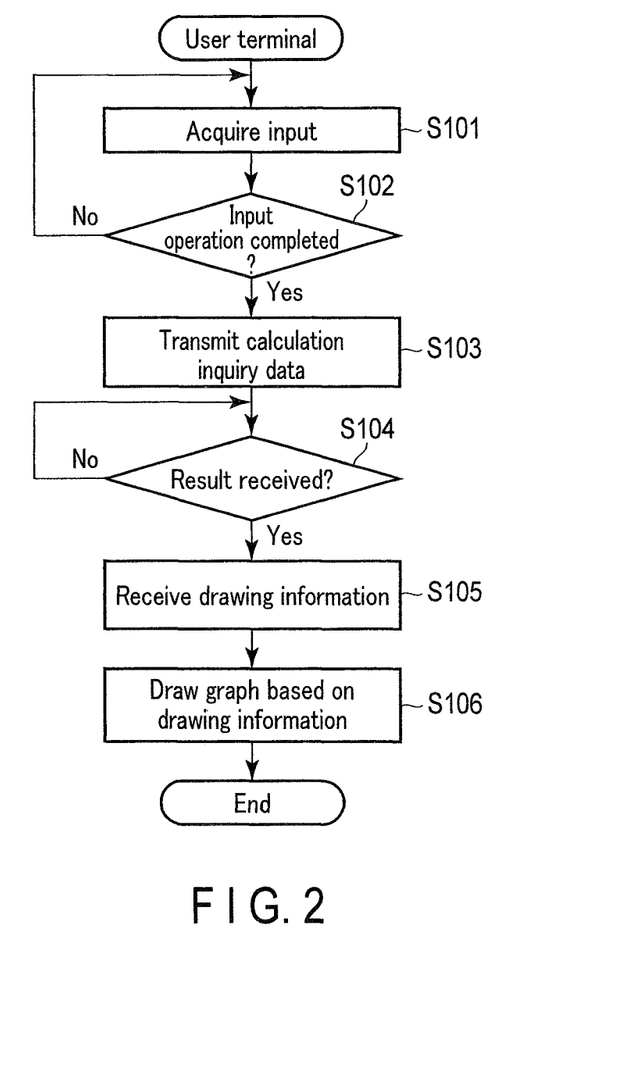
FIG. 2 is a flowchart schematically illustrating an example of how processing is performed by the user terminal related to the graph drawing function according to one embodiment.
Figure 3:
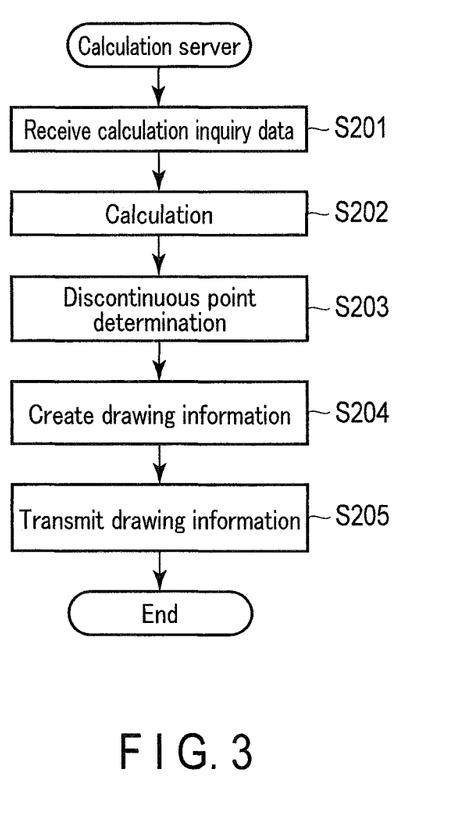
FIG. 3 is a flowchart schematically illustrating an example of how processing is performed by the calculation server related to the graph drawing function according to the first embodiment.

A description will now be given, with reference to the drawings, of an operation performed by the graph drawing system 1 of the present embodiment. FIG. 2 schematically illustrates an example of an operation performed by the user terminal 10 related to the function graph drawing function of the scientific calculator web application. FIG. 3 schematically illustrates an example of an operation performed by the calculation server 20 related to the function graph drawing function of the scientific calculator web application. Operations performed by the user terminal 10 and calculation server 20 related to the function graph drawing function will be described with reference to FIGS. 2 and 3.

FIG. 2 shows a process performed when a website of the scientific calculator web application of the present embodiment is accessed by the web browser and a web page related to the function graph drawing function is selected and displayed.

In step S101, the user terminal 10 acquires an input entered to the input device 15 and specifies what is entered in an input form on the browser. The user terminal 10 updates the input form displayed on the display 16 while storing the input data in the memory.

Figure 4:
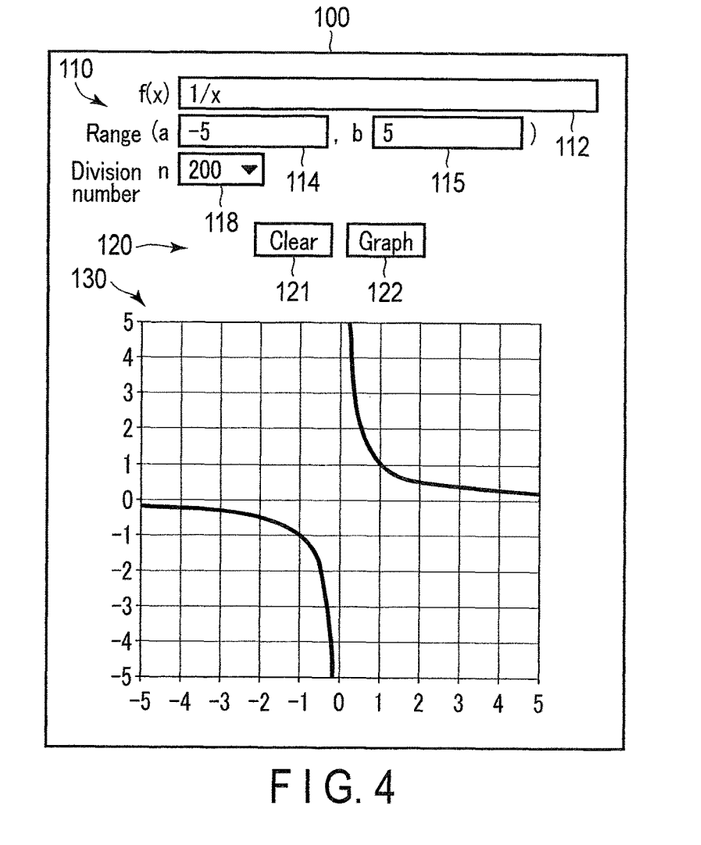
FIG. 4 is a diagram schematically illustrating an example of a display screen related to the function graph drawing function.

FIG. 4 illustrates an example of a display screen related to the function graph drawing function according to the present embodiment. The display screen 100 related to the function graph drawing function includes an input form 110, operation buttons 120, and a graph drawing area 130. When the function graph drawing function is started, the input form 110 is blank, and no graph is drawn in the graph drawing area 130.

The input form 110 includes a function form 112 to which a function whose graph is to be drawn is entered, a minimum value form 114 to which a minimum value of the graph in a display range is entered, a maximum value form 115 to which a maximum value of the graph in the display range is entered, and a division number form 118 to which the number of points to be plotted is entered. The larger the number is, the smaller will be the step size between plot points with respect to the display range of the graph. In the process of step S101, an input to the input form 110 is acquired.

The operation buttons 120 include a clear button 121 and a graph button 122. The clear button 121 is a button for clearing the input to the input form 110. The graph button 122 is a button operated when the function, values etc. entered to the input form 110 are transmitted to the calculation server 20 as calculation inquiry data, and drawing information, namely, data used for drawing a graph, is requested to the calculation server 20.

When the drawing information, namely, the data used for drawing the graph, is received from the calculation server 20 in response to the selection of the graph button 122, the web browser of the user terminal 10 draws a graph in the graph drawing area 130 based on the drawing information.

In step S102, the user terminal 10 determines whether or not the input operation is completed, that is, whether or not the graph button 122 is selected. If the graph button 122 is not selected, the process returns to step S101, and the acquisition of the input to the input form 110 is repeated. On the other hand, if the input operation to the input form is completed and the graph button 122 is selected, the process proceeds to step S103.

In step S103, the user terminal 10 transmits the calculation inquiry data, by which the drawing information for drawing the graph is requested, to the calculation server 20. The calculation inquiry data includes information on the function and values entered in the input form 110.

An example of the information included in the calculation inquiry data will be described. As shown in FIG. 4, in this example, the function is $f(x)=1/x$, the drawing range is $-5 \leq x \leq 5$ and $-5 \leq y \leq 5$, and the range of $-5 \leq x \leq 5$ is divided into 200 points, that is, a graph is drawn in the x axis direction with a step size of 0.05.

```
{
  "type":"plot",
  "expression":"1/x",
  "graphType":"y=",
  "xmin":-5,
  "xmax":5,
  "xstep":0.05,
  "ymin":-5,
  "ymax":5,
  "ystep":null
}
```

The parameters indicate the following:

type: designation of which type of data is to be obtained in calculation API expression: graph function expression (character string)

graphType: determination of whether the expression is an inequality (y=, y>, y>=, y<, y<=)

xmin: minimum value of the x coordinate in the graph area xmax: maximum value of the x coordinate in the graph area xstep: calculation step value in the x direction of the xy coordinates ymin: minimum value of the y coordinate in the graph area ymax: maximum value of the y coordinate of the graph area ystep: calculation step value in the y direction of the xy coordinates Upon reception of the calculation inquiry data including the above information, the calculation server 20 executes the operation outlined in FIG. 3. That is, in step S201, the calculation server 20 receives calculation inquiry data. In step S202, the calculation server 20 calculates coordinates of drawing points, that is, points for drawing a graph, based on the function, graph display range, calculation step size, etc. entered in the input form 110 and included in the received calculation inquiry data. For example, the calculation server 20 substitutes the value of the variable x into the function while changing the value of x by a step size, thereby calculating coordinates of a plurality of drawing points.

In step S203, the calculation server 20 performs a discontinuous point determination, by which the calculation server 20 determines whether the adjacent points of a plurality of drawing points for drawing a graph are continuous points that can be connected by a line or discontinuous points that should not be connected by a line. The discontinuous point determination can be performed in various methods, such as a method including differential calculation. Where the calculation server 20 stores information on basic functions that may include discontinuous points, the determination of discontinuous points can be performed by referring to the information. For example, the calculation server 20 may store information indicating that functions $y=1/x$, $y=\tan(x)$ etc. can include discontinuous points. A determination result of the discontinuous point determination is used as continuity/discontinuity information. In step S204, the calculation server 20 refers to a plurality of drawing points and the continuity/discontinuity information and creates drawing information that enables the user terminal 10 to draw a graph. In step S205, the calculation server 20 transmits the created drawing information to the user terminal 10.

An example of the drawing information is as below. This is an example of the drawing information for the calculation inquiry data described above.

```
{
  "d":{
    "plot":[
      [
        [-5.00,-0.20000]
        [-4.95,-0.20202]
        [-4.90,-0.20408]
        [-4.85,-0.20619]
        [-4.80,-0.20833]
        ...
        [-0.25,-4.00000]
        [-0.20,-5.00000]
        [-0.15,-6.66667]
        [-0.10,-10.00000]
        [-0.05,-20.00000]
      ],
      [
        [0.05,20.00000]
        [0.10,10.00000]
        [0.15,6.66667]
        [0.20,5.00000]
        [0.25,4.00000]
        ...
        [4.80,0.20833]
        [4.85,0.20619]
        [4.90,0.20408]
        [4.95,0.20202]
        [5.00,0.20000]
      ]
    ]
  }
}
```

"plot":[ ] is data representing a graph of a function expressed by a three-dimensional array. The first dimension is an array that sequentially shows continuous lines as elements in the graph. For example, in a graph including discontinuous points as in $f(x)=1/x$, the number of elements is more than one. The second dimension is an array that sequentially shows the coordinates of the drawing points of continuous lines in the graph as elements. The third dimension is an array in which the first element is the x coordinate and the second element is the y coordinate. As can be seen, the third-dimension information indicates the coordinates of drawing points. The second-dimensional information sequentially indicates drawing points that are represented as coordinates and that should be connected to each other. The first-dimensional information is an enumeration of the second-dimensional information. In this manner, the drawing information has a multidimensional array structure. In the drawing information, the drawing points to be connected to each other are grouped. According to such a multidimensional array structure, data can include information on the coordinates of drawing points and continuity/discontinuity information in a simple format.

For example, in the case where data received from the calculation server 20 is as follows:

```
"plot":[
  [
    [x1, y1]
    [x2, y2]
  ]
  [
    [x3, y3]
    [x4, y4]
  ]
]
```

The scientific calculator web application of the user terminal 10 draws the following graph. That is, the user terminal 10 determines drawing point P1 of coordinates (x1, y1), drawing point P2 of coordinates (x2, y2), drawing point P3 of coordinates (x3, y3), and drawing point P4 of coordinates (x4, y4). The CPU 11 of the user terminal 10 draws a graph such that drawing point P1 and drawing point P2 are connected to each other with a line, drawing point P3 and drawing point P4 are connected to each other with a line, and drawing point P2 and drawing point P3 are not connected to each other.

The data format mentioned above is an example using JSON (JavaScript Object Notation), but the data format is not limited to this. Any type of data may be used as drawing information as long as it includes the coordinates of drawing points of a graph and continuity/discontinuity information indicating whether or not to connect drawing points.

The user terminal that receives the drawing information described above performs the following operation. That is, in step S104, the user terminal 10 determines whether or not the drawing information, which is a calculation result of the calculation server 20, is received from the calculation server 20. If no data is received, the processing of step S104 is repeated to stand by until the drawing information is received from the calculation server 20. If the drawing information is received, the process proceeds to step S105. In step S105, the user terminal 10 receives the drawing information. In step S106, the CPU 11 of the user terminal 10 draws a graph on the web browser based on the received drawing information. As a result, a graph of a requested function is drawn, like the graph shown in the graph drawing area 130 in FIG. 4.

The calculation server 20 according to the present embodiment performs a discontinuous point determination. If discontinuous points exist, the calculation server 20 creates drawing information in consideration of the discontinuous point determination. As a result, a correct graph is drawn as shown in FIG. 4.

As described above, the CPU 11, communication device 17, etc. of the user terminal 10 function as: a calculation inquiry data transmission section for transmitting calculation inquiry data including information on an entered function to the calculation server 20; a drawing information reception section for obtaining drawing information for drawing a graph corresponding to a function from the calculation server 20; and a graph drawing section for drawing a graph corresponding to the function, based on the drawing information and for displaying the drawn graph on the display 16. Further, the CPU 21, communication device 25, etc. of the calculation server 20 function as: a calculation inquiry data reception section for obtaining calculation inquiry data from the user terminal 10; an operation section for calculating drawing information based on the calculation inquiry data, such that the calculated drawing information includes coordinates of a plurality of drawing points represented by the function in the graph drawing area 130 of the display 16 and continuity/discontinuity information for indicating whether or not to connect two adjacent drawing points; and a drawing information transmission section for transmitting the calculated drawing information to the user terminal 10.

For example, let us consider a case where the coordinate information on the points to be plotted is enumerated in drawing information, without the discontinuous point determination being performed. That is, drawing information that does not include continuity/discontinuity information, as described below, will be considered.

```
{
  "d":{
    "plot":[
      [
        [−5.00,−0.20000]
        [−4.95,−0.20202]
        [−4.90,−0.20408]
        [−4.85,−0.20619]
        [−4.80,−0.20833]
        ...
        [4.80,0.20833]
        [4.85,0.20619]
        [4.90,0.20408]
        [4.95,0.20202]
        [5.00,0.20000]
      ]
    ]
  }
}
```

Figure 5:
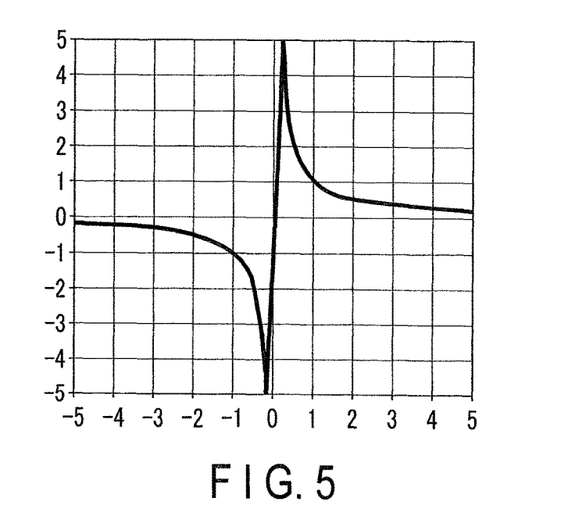
FIG. 5 is a diagram illustrating an example of a graph according to a comparative example.

The graph drawn in the graph drawing area 130 based on the above drawing information is like that shown in FIG. 5. That is, the mathematically correct graph is not drawn. The user terminal that receives the drawing information and draws the graph cannot determine whether or not the drawing based on the drawing information is correct.

The calculation server 20 according to the present embodiment can generate drawing information that enables a correct graph to be drawn even if a graph includes discontinuous points, such as y=1/x, y=tan(x), etc. In particular, when a graph of a function divergent to ±∞ at discontinuous points is drawn, drawing information that enables a mathematically correct graph to be drawn can be created. Therefore, the user terminal can draw a mathematically correct graph.

In the graph drawing system 1 according to the present embodiment, the calculation server 20 exists behind the web server 32 with respect to the internet 30, so that operation algorithms executed by the calculation server 20 can be concealed from the user terminal 10. That is, the provider of the scientific calculator web application can conceal the advanced operation algorithms from others.

Further, since the user terminal 10 only draws a graph based on the data on an operation result without performing the operation, the processing load of the user terminal 10 is relatively light. Further, since the calculation server 20 having a high processing capability is employed, the user terminal 10 can indicate the result of a complicated operation.

Second Embodiment

The second embodiment will be described. In the description below, reference will be made to how the second embodiment differs from the first embodiment. Therefore, the same symbols will be used to denote structural elements similar or corresponding to those of the first embodiment, and a description of such structural elements will be omitted. In the present embodiment, the user can operate the graph drawing area 130 and change the range displayed as a graph in the graph drawing area 130. At this time, the user terminal 10 determines whether or not drawing information should be received again by causing the calculation server 20 to perform recalculation, and retransmits calculation inquiry data only when necessary.

Figure 6:
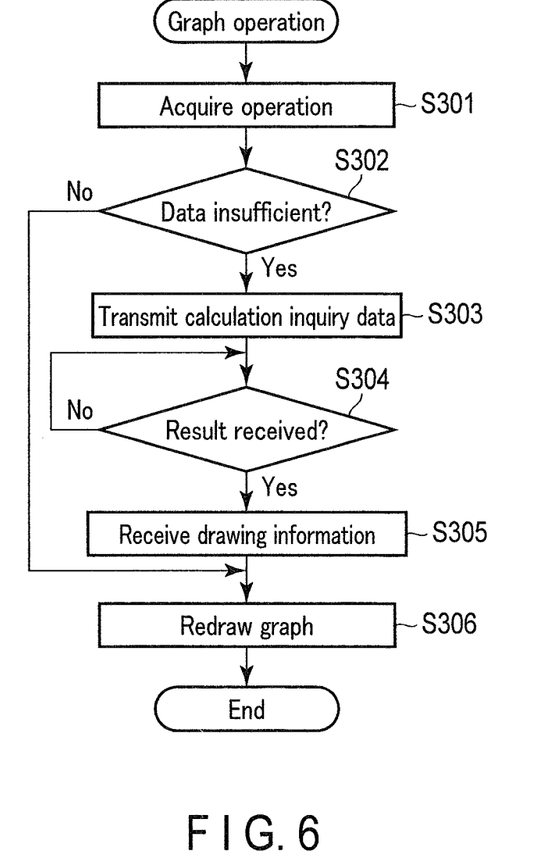
FIG. 6 is a flowchart schematically illustrating an example of how graph operation processing is performed by a user terminal related according to the second embodiment.

A graph operation, which the user terminal 10 of the present embodiment performs when the graph drawing area 130 is operated to change the range displayed as a graph, will be described with reference to the flowchart shown in FIG. 6.

Figure 7:
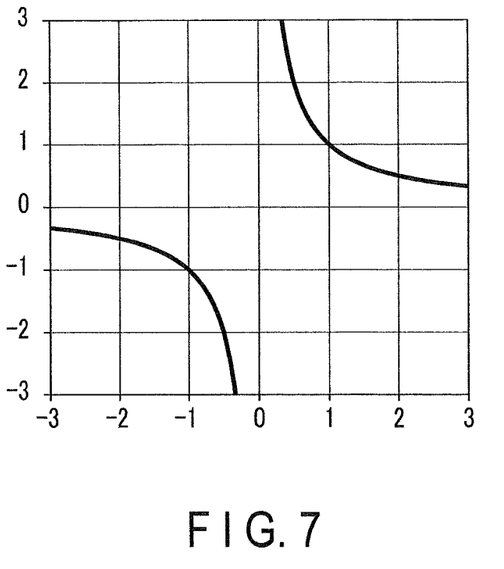
FIG. 7 is a diagram for illustrating a case where an enlargement operation is performed.

In step S301, the user terminal 10 acquires an operation performed for the graph drawing area 130. The operation for the graph drawing area 130 is performed, for example, as follows. Let us consider the case where the user terminal 10 includes a touch panel provided on the display 16 as an input device 15. When a pinch-out or pinch-in operation is performed for the graph drawing area 130, the display range of the coordinates is narrowed for enlarged display or is widened for reduced display. In either case, the actual size of the graph drawing area 130 is kept unchanged. For example, in the state shown in FIG. 4, when the pinch-out operation is performed for the graph drawing area 130, the display on the graph drawing area 130 is such an enlarged display as shown in FIG. 7. In addition, when a drag operation is performed on the touch panel, the display range is moved in the plus or minus direction with respect to the ordinate axis, the abscissa axis, or both axes (oblique direction).

These operations do not have to be performed with the touch panel. For example, the same operations can be performed using a mouse. Also, the display screen 100 may be provided with an enlargement button, a reduction button, up/down/left/right movement button, etc. When these buttons are selected, enlargement, reduction, and up/down/left/right movement are performed.

In step S302, the user terminal 10 determines whether or not data is insufficient to perform a display change for the operation acquired in step S301.

For example, when an enlargement operation is performed in the state shown in FIG. 4 and the display shown in FIG. 7 is to be performed, the display shown in FIG. 7 can be attained using the same data as used for drawing the graph shown in FIG. 4. In such a case, it is determined that the data is not insufficient. However, if the enlargement ratio is too large, a smooth graph cannot be drawn. If a smooth graph cannot be drawn, it is determined that the data is insufficient.

Figure 8:
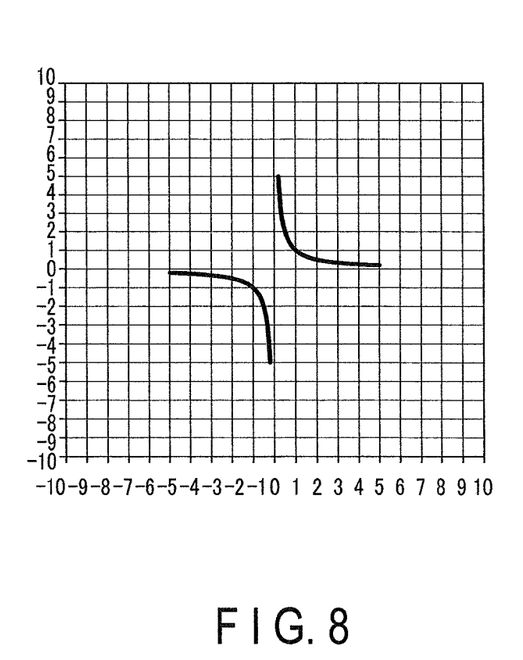
FIG. 8 is a diagram for illustrating a case where a reduction operation is performed.

If the data is not supplemented when the reduction operation is performed, such a graph as shown in FIG. 8 is displayed, so that it is determined that the data is insufficient. In addition, if the display area is moved in the direction of extending the currently drawn graph, it is determined that the data is insufficient.

If it is determined that the data is not insufficient, the process proceeds to step S306. On the other hand, if it is determined that the data is insufficient, the process proceeds to step S303.

In step S303, the user terminal 10 retransmits the calculation inquiry data to the calculation server 20, as in step S103, and requests data for drawing a graph. At this time, the function to be designated is not changed, but the drawing range is changed according to the user's graph operation. In response to the transmission of the calculation inquiry data by the user terminal 10, the calculation server 20 performs calculation for drawing a graph to create drawing information, and supplies the drawing information to the user terminal 10.

In step S304, the user terminal 10 determines whether or not the drawing information, which is the operation result of the calculation server 20, is received, and stands by until the reception of the drawing information. If the drawing information is received, the process proceeds to step S305. In step S305, the user terminal 10 receives the drawing information. Subsequently, the process proceeds to step S306.

In step S306, the CPU 11 of the user terminal 10 redraws a graph on the web browser. At the time, if it is determined in step S302 that the data is not insufficient, the graph is redrawn using the data already retained in the user terminal 10 (for example, the drawing information temporarily stored in the RAM 13). If it is determined in step S302 that the data is insufficient, the graph is redrawn using the drawing information obtained by the recalculation and received in step S305.

As can be seen from the above, the CPU 11, the communication device 17, etc. function as: an operation acquisition section that acquires a graph operation for translating, enlarging, or reducing the graph drawn on the display 16; and a retransmission determination section for determining whether to retransmit calculation inquiry data to the calculation server 20, indicating that new drawing information is required to redraw a graph in accordance with the graph operation.

According to the present embodiment, it is first determined whether or not the data for drawing a graph is insufficient when the graph is redrawn in accordance with the user's graph operation, and recalculation is requested to the calculation server 20 only when the data is insufficient. Since recalculation is not required where the data is not determined to be insufficient, the communication amount between the user terminal 10 and the calculation server 20 is reduced. In addition, the computational load of the calculation server 20 is also reduced.

Third Embodiment

The third embodiment will be described. In the description below, reference will be made to how the third embodiment differs from the first embodiment. Therefore, the same symbols will be used to denote structural elements similar or corresponding to those of the first embodiment, and a description of such structural elements will be omitted. In the present embodiment, the calculation server 20 accumulates drawing information, i.e., a computation result, in the storage 24 each time calculation inquiry data is received from the user terminal 10. That is, a combination of the calculation inquiry data and the drawing information is accumulated in the storage 24. If the same calculation inquiry data is received from the user terminal 10, the calculation server 20 reads the drawing information stored in the storage 24 and transmits it to the user terminal 10. At this time, the calculation server 20 does not perform recalculation.

Figure 9:
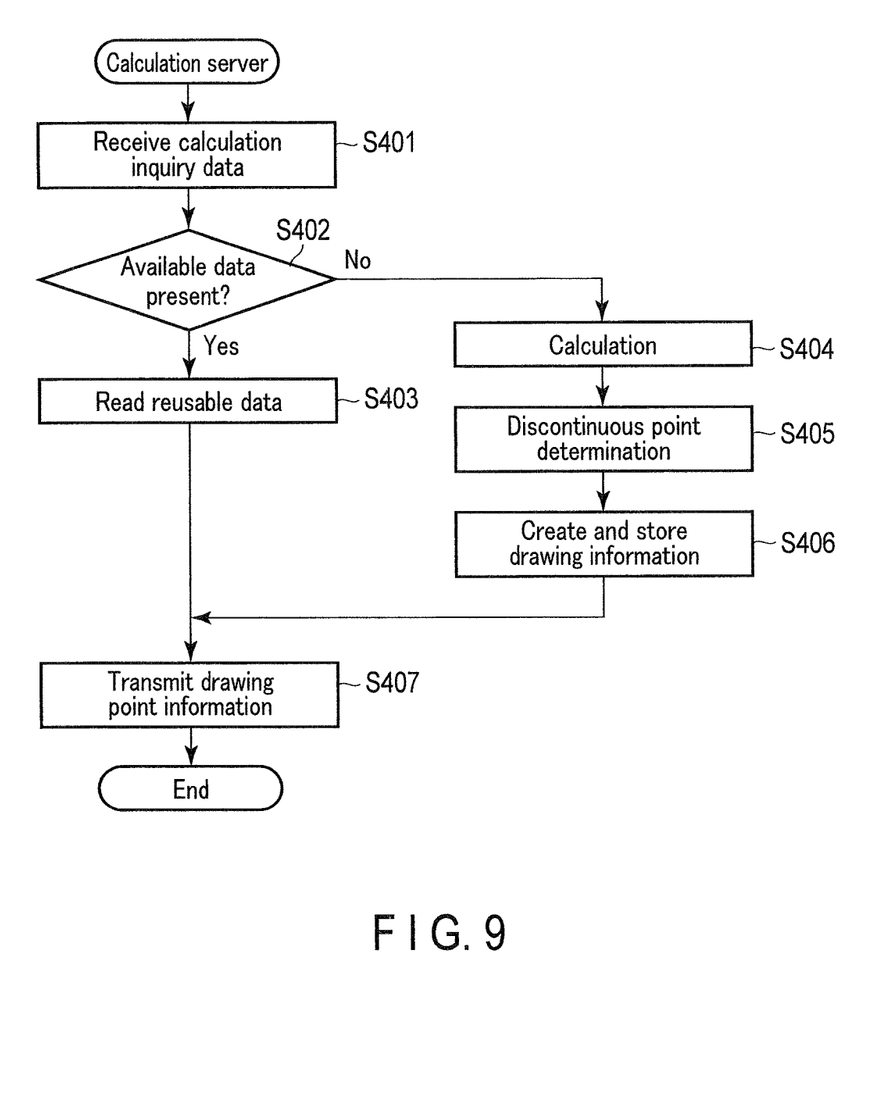
FIG. 9 is a flowchart schematically illustrating an example of how processing is performed by a calculation server according to the third embodiment.

An operation of the calculation server 20 of the present embodiment will be described with reference to the flowchart shown in FIG. 9.

In step S401, the calculation server 20 receives calculation inquiry data. In step S402, the calculation server 20 searches the storage 24 for drawing information calculated in the past, and determines whether there is available data for the data requested this time. When there is available data, the process proceeds to step S403. In step S403, the calculation server 20 reads reusable data from the storage 24 and prepares it as drawing information to be transmitted to the user terminal 10. Subsequently, the process proceeds to step S407.

If it is determined in step S402 that there is no available data, the process proceeds to step S404. In step S404, the calculation server 20 calculates the coordinates of drawing points for drawing a graph based on the received calculation inquiry data, as in step S202. In step S405, the calculation server 20 performs a discontinuous point determination, as in step S203. In step S406, the calculation server 20 creates drawing information that enables the user terminal 10 to draw a graph and prepares it as drawing information to be transmitted to the user terminal 10, as in step S204. Further, the calculation server 20 stores the drawing information in the storage 24.

In step S407, the calculation server 20 transmits the drawing information prepared in step S403 or step S406 to the user terminal 10.

According to the present embodiment, the CPU 21 of the calculation server 20 searches the accumulated drawing information, and if the drawing information that can be reused is stored in the storage 24, recalculation is not performed and that drawing information is reused. Accordingly, the computational load of the calculation server 20 is reduced.

It should be noted that the technique according to the second embodiment and the technique according to the third embodiment may be used in combination. In this case, the advantages of both the second and third embodiments can be obtained simultaneously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graph drawing system comprising an electronic device, and a calculation server connected to the electronic device via a network, wherein:
the electronic device includes an input device, a display, a first processor, and a first communication device,
the calculation server includes a second processor and a second communication device,
the first processor is configured to:
generate calculation inquiry data including information on a function in response to the information on the function being entered from the input device by a user operation, and
transmit the calculation inquiry data to the calculation server via the first communication device,
the second processor is configured to:
in response to acquisition of the calculation inquiry data from the electronic device via the second communication device, calculate drawing information based on the calculation inquiry data, the drawing information being information which the first processor uses for drawing a graph corresponding to the function and including coordinates of a plurality of drawing points and continuity/discontinuity information, the coordinates of the plurality of drawing points being represented by the function and being plotted in a graph drawing area of the display, and the continuity/discontinuity information indicating whether or not adjacent points of the drawing points should be connected to each other, and
transmit the calculated drawing information to the electronic device via the second communication device, and
the first processor is configured to:
in response to acquisition of the drawing information from the calculation server via the first communication device,
cause the display to display a graph corresponding to the function, based on the drawing information.

2. The graph drawing system according to claim 1, wherein the continuity/discontinuity information includes information for grouping drawing points which are included among the drawing points and which are to be connected to each other.

3. The graph drawing system according to claim 1, wherein the drawing information has a multidimensional array structure and includes:
third-dimensional information indicating coordinates of the drawing points;
second-dimensional information sequentially indicating the coordinates of the drawing points which are to be connected to each other; and
first-dimensional information enumerating the second-dimensional information.

4. The graph drawing system according to claim 1, wherein the calculation inquiry data includes information on the function and information on a step size of a variable of the function.

5. The graph drawing system according to claim 4, wherein the second processor is configured to calculate the drawing information by:
calculating coordinates of the drawing points by substituting the variable into the function, while changing the variable by the step size; and
performing a discontinuous point determination for each of the plurality of drawing points to determine the continuity/discontinuity information.

6. The graph drawing system according to claim 5, wherein the second processor is configured to perform the discontinuous point determination by a method including differential calculation.

7. The graph drawing system according to claim 5, wherein:

the calculation server further includes a storage,
the storage stores information on a function that may include discontinuous points, and
the second processor is configured to perform the discontinuous point determination by referring to the information on the function that may include the discontinuous points.

8. The graph drawing system according to claim 1, wherein, in response to acquisition from the input device of a graph operation for moving, enlarging, or reducing the graph drawn on the display,
the first processor is configured to determine whether or not new drawing information is necessary for redrawing the graph in accordance with the graph operation, and thereby determine whether or not the calculation inquiry data should be retransmitted to the calculation server via the first communication device.

9. The graph drawing system according to claim 8, wherein the electronic device further includes a memory which temporarily holds the drawing information acquired from the calculation server.

10. The graph drawing system according to claim 9, wherein the first processor is configured to:
retransmit the calculation inquiry data to the calculation server via the first communication device in response to a determination that retransmission of the calculation inquiry data is necessary, and
redraw the graph in accordance with the graph operation, based on the drawing information held in the memory, in response to a determination that the retransmission of the calculation inquiry data is not necessary.

11. The graph drawing system according to claim 10, wherein the first processor is configured to:
determine whether or not data for redrawing the graph is insufficient to redraw the graph based on the graph operation,
determine that the retransmission of the calculation inquiry data is necessary in response to a determination that the data for redrawing the graph is insufficient, and
determine that the retransmission of the calculation inquiry data is not necessary in response to a determination that the data for redrawing the graph is not insufficient.

12. The graph drawing system according to claim 1, wherein
the calculation server further includes a storage for accumulating the drawing information for each of the calculation inquiry data acquired from the electronic device.

13. The graph drawing system according to claim 12, wherein the second processor is configured to accumulate in the storage a combination of the calculation inquiry data and the drawing information corresponding to the calculation inquiry, data, each time the calculation inquiry data is acquired from the electronic device.

14. The graph drawing system according to claim 13, wherein the second processor is configured to compare the calculation inquiry data acquired from the electronic device with information stored in the storage and determine whether or not the drawing information should be recalculated.

15. The graph drawing system according to claim 14, wherein the second processor is configured to:
recalculate the drawing information based on the calculation inquiry data acquired from the electronic device, and transmit the recalculated drawing information to the electronic device via the second communication device, in response to a determination that recalculation of the drawing information is necessary, and
transmit the drawing information stored in the storage to the electronic device, in response to a determination that the recalculation of the drawing information is not necessary.

16. An electronic device comprising an input device, a display, a processor, and a communication device,
wherein the processor is configured to:
generate calculation inquiry data including information on a function including discontinuous points, in response to the information on the function including the discontinuous points being entered from the input device by a user operation,
transmit the calculation inquiry data, via the communication device, to a calculation server connected to the electronic device via a network,
acquire drawing information, via the communication device, from the calculation server that processes the calculation inquiry data acquired from the electronic device, the drawing information being information which the processor uses for drawing a graph corresponding to the function and including coordinates of a plurality of drawing points and continuity/discontinuity information, the coordinates of the plurality of drawing points being represented by the function and being plotted in a graph drawing area of the display, and the continuity/discontinuity information indicating whether or not adjacent points of the drawing points should be connected to each other, and
cause the display to display a graph corresponding to the function based on the drawing information, upon acquisition of the drawing information.

17. A calculation server comprising:
a processor, and
a communication device,
wherein, in a case where an electronic device comprising both an input device and a display receives information on a function by a user operation and calculation inquiry data including the information on the function is acquired from the electronic device via a network and the communication device, the processor is configured to:
calculate drawing information based on the calculation inquiry data, the drawing information including coordinates of a plurality of drawing points and continuity/discontinuity information, the coordinates of the plurality of drawing points being represented by the function and being plotted in a graph drawing area of the display, and the continuity/discontinuity information indicating whether or not an adjacent two points of the drawing points should be connected to each other, and
transmit the calculated drawing information to the electronic device via the communication device.

18. A control method for a graph drawing system, the graph drawing system comprising (i) an electronic device including an input device, a display, a first processor, and a first communication device, and (ii) a calculation server including a second processor and a second communication device, the calculation server being connected to the electronic device via a network, and the control method comprising:
in response to information on a function being entered from the input device by a user operation, causing the first processor to:

generate calculation inquiry data including the information on the function, and transmit the calculation inquiry data to the calculation server via the first communication device;

causing the second processor to:

acquire the calculation inquiry data via the second communication device, calculate drawing information based on the calculation inquiry data, the drawing information being information which the first processor uses for drawing a graph corresponding to the function and including coordinates of a plurality of drawing points and continuity/discontinuity information, the coordinates of the plurality of drawing points being represented by the function and being plotted in a graph drawing area of the display, and the continuity/discontinuity information indicating whether or not an adjacent two points of the drawing points should be connected to each other, and transmit the calculated drawing information to the electronic device via the second communication device; and causing the first processor to:

acquire the drawing information from the calculation server via the first communication device, and display, on the display, a graph corresponding to the function, based on the drawing information.

19. A non-transitory computer-readable storage medium storing a program executable by a processor of a calculation server comprising the processor and a communication device to control the processor to execute functions comprising:

aquiring calculation inquiry data including information on a function from an electronic device via a network and the communication device, in response to the information on the function being entered by a user operation from the electronic device comprising an input device and a display, calculating drawing information based on the calculation inquiry data, the drawing information including coordinates of a plurality of drawing points and continuity/discontinuity information, the coordinates of the plurality of drawing points being represented by the function and being plotted in a graph drawing area of the display, and the continuity/discontinuity information indicating whether or not an adjacent two points of the drawing points should be connected to each other, and transmitting the calculated drawing information to the electronic device via the communication device.

\* \* \* \* \*

UNITED STATES PATENT AND TRADEMARK OFFICE
CERTIFICATE OF CORRECTION

PATENT NO. : 10,607,379 B2
APPLICATION NO. : 16/124533
DATED : March 31, 2020
INVENTOR(S) : Hirokazu Tanaka It is certified that error appears in the above-identified patent and that said Letters Patent is hereby corrected as shown below:

In the Claims

Column 11, Line 62, Claim 1, Line 1, delete "comprising" and insert --comprising:--.
Column 13, Line 54, Claim 13, Line 5, delete "inquiry," and insert --inquiry--.
Column 14, Line 7, Claim 16, Line 1, delete "comprising" and insert --comprising:--.
Column 16, Line 7, Claim 19, Line 6, delete "aquiring" and insert --acquiring--.

Signed and Sealed this
Seventeenth Day of November, 2020

Andrei Iancu
*Director of the United States Patent and Trademark Office*